Oct. 17, 1933.  H. L. DOWELL ET AL  1,931,107

MOORING SYSTEM

Filed March 30, 1933

Inventors:
Henry L. Dowell,
Leland F. Stone,
by Chas. E. Tullar
Their Attorney.

Patented Oct. 17, 1933

1,931,107

UNITED STATES PATENT OFFICE 1,931,107

MOORING SYSTEM

Henry L. Dowell, Caldwell, N. J., and Leland F. Stone, Congers, N. Y., assignors to General Electric Company, a corporation of New York Application March 30, 1933. Serial No. 663,516

6 Claims. (Cl. 114—230)

Our invention relates to mooring systems, more particularly to systems for mooring barges and the like so that they can be moved from one unloading station to another without the occurrence of slack in the cable, and has for an object the provision of a simple and reliable system of this character.

Heretofore barges have been secured to the dock by mooring ropes or electrically operated capstans around which the ropes are wound. It has also been proposed to provide cables on drums with one end of the cable attached to the bow of the barge and the other end to the stern. The drums are then operated to pay out one end of the cable and to pull in the other end and thus move the barge back and forth between unloading stations. These methods, however, do not take into consideration the rise and fall of the tide and furthermore such systems leave much to be desired in holding the barge close to the dock.

A further object of our invention, therefore, is to provide a system which holds the boat against the dock and limits the tension on the mooring cable to a predetermined amount irrespective of variations in tide.

In accordance with our invention in one form thereof, we secure the respective ends of the mooring cable to drums spaced apart from each other along the dock and we control the energization of the drum driving motors so that one motor winds up the cable against a predetermined opposition of the other motor.

Figure 1:
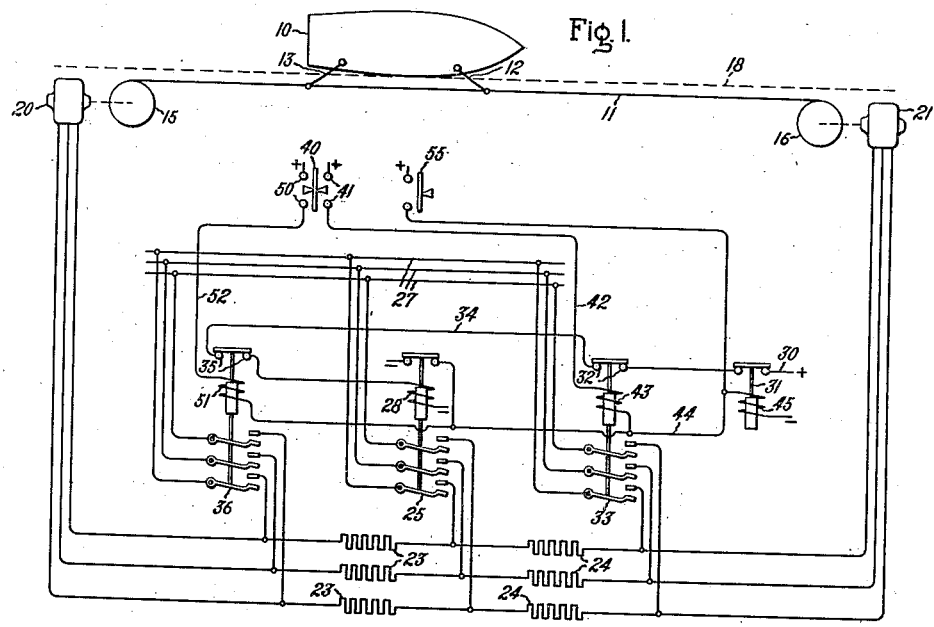
Figure 2:
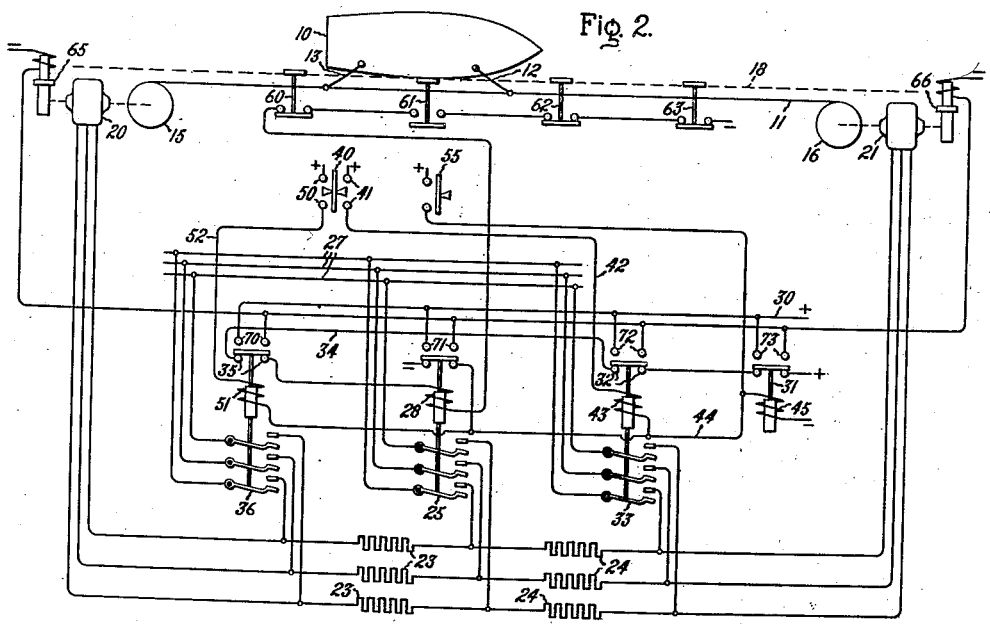

For a more complete understanding of our invention reference should now be had to the accompanying drawing wherein we have diagrammatically shown in Fig. 1 our invention in one form while Fig. 2 illustrates a modification of the system of Fig. 1.

Referring now to the drawing, we have shown in Fig. 1 one form of our invention as applied to the control of a barge 10. The barge 10 is connected to the mooring cable 11 by means of short cable extensions 12 and 13 secured to the bow and stern of the barge and to the cable 11. The respective ends of the mooring cable 11 are secured to and wound about cable drums 15 and 16. When the cable 11 is taut the barge 10 will be held close against the edge of the unloading dock indicated by the broken line 18. When the barge is to be held in a stationary position a motor 20 geared to the drum 15 is energized in a direction to wind the cable onto the drum. Similarly, a motor 21 geared to the cable drum 16 is energized to wind the opposite end of the cable on the drum 16. In order to limit the torque of the motors 20 and 21 to a value safely under the elastic limit of the cable 11, resistors 23 and 24 are respectively connected in the motor circuits. The contactor 25 is arranged to simultaneously energize the motors 20 and 21 through their respective resistors 23 and 24 from a suitable source of supply as indicated by the supply lines 27. The energizing circuit for the operating coil 28 of the contactor 25 may be traced from the positive supply line 30, relay 31, interlock contacts 32 of contactor 33, conductor 34, interlock contacts 35 of contactor 36 and by an operating coil 28 to the negative source of supply.

In case there is a falling tide, the weight of the barge increases the tension on the cable 11 until one or both drums are rotated against the torque exerted by the motors 20 and 21 and this rotation continues until the tension in the cable has been reduced to the predetermined amount. Conversely, if there is a rising tide the barge will rise and slacken the cable so that one or both motors will be operated to reestablish the tension in the cable.

If it is desired to move the barge 10 from the position shown to a position near the cable drum 16, it is only necessary to operate the push button 40. Consequent to the closing of the contacts 41 by the push button 40 an energizing circuit is completed for the contactor 33. This circuit may be traced from the positive source of supply through contacts 41, conductor 42, operating coil 43 of contactor 33, conductor 44 and by operating coil 45 through the relay 31 to the negative source of supply. The contactor 33 thereupon closes to connect the motor 21 directly across the supply lines 27 while the motor 20 is energized through the resistors 23 and 24 connected in series with each other. The torque of the motor 21 consequently is much greater than the torque produced by motor 20 so that the motor 21 functions to wind the cable on the drum 16 and to move the barge 10 along the dock 18. Due to the drag of the motor 20 the cable 11 is kept taut and the barge 10 is maintained against the dock at all times.

It will be remembered that the energizing circuit for the operating coil 43 included the operating coil 45. The coil 45 operates to open the relay contacts 31 to deenergize the operating coil 28 of the contactor 25 at the same time that the operating coil 43 is energized.

As soon as the barge 10 reaches a desired position along the dock, the push button 40 is operated to interrupt the circuit to the contacts 41 so as to deenergize the operating coil 43 of the contactor 33. The contactor 33 is immediately operated to an open position while the relay contacts 31 are operated to complete an energizing circuit for the operating coil 28 of the contactor 25. The closing of this contactor reestablishes the energization of the motors 20 and 21 so as to maintain a predetermined tension of the cable during the time the barge 10 is at a standstill.

As soon as it is desired to move the barge 10 towards the drum 15, the push button 40 is operated to close its contacts 50. An operating circuit is thereby completed for the operating coil 51 of the contactor 36 through a circuit which may be traced from the positive source of supply by the contacts 50, conductor 52, operating coil 51 and by conductor 44 and the operating coil 45 to the negative source of supply. As before, the relay contacts 31 are opened to deenergize the operating coil 28 of the contactor 25. At the same time the operating coil 51 operates the contactor 36 to its closed position to connect the motor 20 directly to the supply lines 27 and to energize the motor 21 with the resistances 23 and 24 again connected in series in the motor circuit. In this case the motor 21 acts as a drag to maintain a predetermined tension in the cable 11 during the time the motor 20 is winding the cable on the drum 15 and moving the barge along the dock.

In order to disconnect the cables 12 and 13 from the barge 10, the push button 55 is closed to complete an energizing circuit for the releasing relay 31 which operates to open its contacts. The opening of these contacts it will be remembered deenergizes the operating coil 28 of the contactor 25 so that the motors 20 and 21 are deenergized. Sufficient slack may then be had in the cable 11 to permit the unfastening of the cables 12 and 13.

In case the barge 10 is to be moored to the dock for a considerable length of time we prefer to use the modified form of our invention shown in Fig. 2. The system of Fig. 2 is also preferred in locations where the cost of power is high and the continuous energization of the motors 20 and 21 proves costly. The parts of Fig. 2 corresponding with Fig. 1 are similarly numbered and it will be observed that the movement of the barge 10 from one position to another is accomplished in the same manner as in Fig. 1. However, when the barge is held at a standstill, a plurality of limit switches 60 to 63, inclusive, are arranged so that at least one of the limit switches will be operated to an open position. As shown, the limit switch 61 is in the open position and serves to interrupt the holding circuit to the operating coil 28 of the contactor 25. Whenever the motors 20 and 21 are deenergized a pair of normally engaged brakes 65 and 66 are arranged to hold the drums 15 and 16 against rotation. The brakes 65 and 66 are adjusted so that if the cable tension is increased above a predetermined amount the drums will be rotated to pay out cable and to maintain the tension in the cable below the predetermined amount. Whenever a contactor is energized before the release push button 55 is operated, the brakes 65 and 66 are electromagnetically released. The release of the brakes is accomplished by the provision of the contacts 70, 71, 72 and 73 arranged to be operated respectively by the contactors 36, 25 and 33 and the releasing relay 31.

While we have shown particular embodiments of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. In a system of mooring barges and the like to a dock, the combination of a cable, cable drums arranged in spaced relation along said dock, a driving motor for each of said drums, and means for selectively controlling the energization of said motors so that one motor produces a torque sufficient to move the barge from one position to another against the torque of the other motor.

2. In a system of mooring barges and the like to a dock, the combination of cable drums arranged in spaced relation along said dock, a cable having its respective ends wound about said drums, a driving motor for each of said drums, means for controlling the energization of said motors so as to produce a torque on one motor of sufficient magnitude to wind the cable about the corresponding cable drum against a torque on the other motor of sufficient magnitude to maintain a predetermined tension in said cable whereby the barge is maintained in close relation with the dock during its movement from one position to another.

3. In a system of mooring barges and the like to a dock, the combination of cable drums arranged in spaced relation along said dock, a cable having its respective ends wound about said drums, a driving motor for each of said cable drums, torque controlling resistors connected in circuit with each of said motors, an energizing circuit for one motor including said resistors and an energizing circuit for the other motor excluding said resistors, and means for simultaneously completing said energizing circuits.

4. In a system of mooring barges and the like to a dock, the combination of a cable, cable drums arranged in spaced relation along said dock, means for securing said barge to an intermediate portion of said cable, a driving motor for each of said drums arranged for rotation in a direction to wind the cable about the drums, torque reducing resistors normally connected in circuit with each of said motors, means for selectively controlling the energization of said motors so as to exclude said resistors from one motor circuit and to include said resistors in the other motor circuit or to include equivalent resistors in each of said motor circuits.

5. In a system of mooring barges and the like to a dock, the combination of cable drums arranged in spaced relation along said dock, a cable having its respective ends wound about said drums, means for attaching a barge to an intermediate portion of said cable, a driving motor for each of said end drums, a normally engaged brake for each of said drums, switching means for controlling the energization of said motors, and means responsive to the operation of said switching means for electrically releasing said brakes.

6. In a system of mooring barges and the like to a dock, the combination of cable drums arranged in spaced relation along said dock, a cable extending between said drums and having its respective ends wound about said drums, means for securing said barge to a portion of the cable between the drums, a plurality of normally closed limit switches arranged along the length of said dock and arranged to be opened by the engagement of said switches by said barge, a normally energized electric motor for driving each of said drums to maintain a predetermined tension of said cable, and means responsive to the opening of one of said limit switches for deenergizing said motors.

HENRY L. DOWELL.
LELAND F. STONE.